United States Patent
Jiang et al.

(10) Patent No.: US 8,486,502 B2
(45) Date of Patent: Jul. 16, 2013

(54) PVDF/PVC ALLOYS FOR PLENUM CABLE APPLICATIONS

(75) Inventors: Qibo Jiang, Ephrata, PA (US); Paul Kroushl, Lancaster, PA (US)

(73) Assignee: Nexans, Paris (FR)

( * ) Notice: Subject to any disclaimer, the term of this patent is extended or adjusted under 35 U.S.C. 154(b) by 150 days.

(21) Appl. No.: 12/847,283

(22) Filed: Jul. 30, 2010

(65) Prior Publication Data

US 2011/0281050 A1  Nov. 17, 2011

Related U.S. Application Data

(60) Provisional application No. 61/334,020, filed on May 12, 2010.

(51) Int. Cl.
*B29D 22/00* (2006.01)

(52) U.S. Cl.
USPC ............................ 428/36.6; 525/190; 525/199

(58) Field of Classification Search
USPC .......................... 428/36.6; 525/185, 190, 199
See application file for complete search history.

(56) References Cited

U.S. PATENT DOCUMENTS

| | | | | |
|---|---|---|---|---|
| 4,046,728 | A * | 9/1977 | Harmuth | 523/437 |
| 4,401,848 | A * | 8/1983 | Tsunoda | 704/274 |
| 4,605,818 | A * | 8/1986 | Arroyo et al. | 174/107 |
| 5,036,121 | A * | 7/1991 | Coaker et al. | 524/100 |
| 7,144,952 | B1 * | 12/2006 | Court et al. | 525/94 |
| 7,208,550 | B2 * | 4/2007 | Mather et al. | 525/199 |
| 7,371,799 | B2 * | 5/2008 | Mather et al. | 525/199 |
| 7,745,545 | B2 * | 6/2010 | Jing et al. | 525/342 |
| 2007/0135578 | A1 * | 6/2007 | Mather et al. | 525/199 |
| 2008/0194736 | A1 * | 8/2008 | Lu | 524/35 |
| 2010/0072644 | A1 * | 3/2010 | Glew | 264/6 |
| 2011/0198106 | A1 * | 8/2011 | Sasamura et al. | 174/110 SR |
| 2011/0281050 | A1 * | 11/2011 | Jiang et al. | 428/36.6 |

\* cited by examiner

*Primary Examiner* — N. Edwards
(74) *Attorney, Agent, or Firm* — Sofer & Haroun, LLP

(57) ABSTRACT

A cable jacket includes an extruded polymer made from PVDF, PVC and a compatibilizing agent, where a ratio of PVDF, PVC and a compatibilizing agent is substantially 7:3:1.

9 Claims, 4 Drawing Sheets

COMPRESSION MOLDED PLAQUES

| SPECIMEN n# | WIDTH h in | THICKNESS s in | PEAK LOAD lbf | STRAIN AT BREAK % | TENSILE c psi | PVDF 2950 % | PVC L6815 % | PVC X-1116 % | ELVALOY % | NOTES |
|---|---|---|---|---|---|---|---|---|---|---|
| 730 | 0.113 | 0.047 | 13.23 | 18 | 2492 | 70.0 | 30.0 | | | |
| PVDF | 0.114 | 0.048 | 25.40 | 1084 | 4642 | 100.0 | | | | |
| T0 | 0.115 | 0.054 | 10.78 | 315 | 1724 | 63.6 | 27.3 | | 9.1 | |
| T1 | 0.115 | 0.049 | 12.24 | 373 | 2186 | 50.0 | 37.5 | | 12.5 | |
| T2 | 0.115 | 0.050 | 12.28 | 544 | 2153 | 50.0 | 33.5 | | 16.5 | |
| T3 | 0.116 | 0.054 | 14.11 | 501 | 2267 | 50.0 | 35.5 | | 14.5 | |
| T4 | 0.115 | 0.057 | 16.62 | 485 | 2544 | 40.0 | 45.0 | | 15.0 | |
| T5 | 0.113 | 0.052 | 8.60 | 371 | 1467 | 63.6 | | 27.1 | 9.1 | SOFT |

EXTRUDED TAPE SAMPLES

| SPECIMEN n# | WIDTH h in | THICKNESS s in | PEAK LOAD lbf | STRAIN AT BREAK % | TENSILE c psi | PVDF 2950 % | PVC L6815 % | PVC X-1116 % | ELVALOY % | NOTES |
|---|---|---|---|---|---|---|---|---|---|---|
| T0 | 0.115 | 0.018 | 9.76 | 462 | 4717 | 63.3 | 27.3 | | 9.1 | |
| T5 | 0.115 | 0.023 | 7.47 | 281 | 2800 | 63.3 | | 27.1 | 9.1 | LTB-10C |

FIG. 3

| SPECIMEN n# | WIDTH h | THICKNESS s | PEAK LOAD | PEAK STRESS | STRAIN AT BREAK | MODULUS | TENSILE c | NOTES |
|---|---|---|---|---|---|---|---|---|
| | in | in | lbf | ksi | % | kd | psi | |
| PVDF | 0.253 | 0.022 | 26.633 | 4.7 | 1053.4 | 34.0 | 4737.9 | After Oil 60 days |
| PVCable JKT | 0.233 | 0.042 | 21.239 | 2.2 | 453.4 | 32.0 | 2195.9 | After Oil 60 days |
| PVCable JKT | 0.234 | 0.041 | 21.171 | 2.2 | 543.8 | 33.2 | 2237.3 | before Oil 60 days |
| Retain% | | | | | 83.4 | 96.2 | 98.1 | |
| T5 EXT | 0.249 | 0.023 | 13.69 | 2.4 | 623.1 | 23.5 | 2382.5 | After Oil 60 days |
| T5 EXT | 0.115 | 0.023 | 7.467 | 2.8 | 280.6 | 24.0 | 2800.0 | before Oil 60 days |
| Retain% | | | | | 222.0 | 96.0 | 85.1 | |

FIG. 4

PVDF/PVC ALLOYS FOR PLENUM CABLE APPLICATIONS

RELATED APPLICATION

This application is related to and claims the benefit of priority from U.S. Provisional Patent Application No. 61/334,020, filed on May 12, 2010, the entirety of which is incorporated by reference.

BACKGROUND

1. Field of the Invention

The present arrangement relates to communication cables. More particularly, the present arrangement relates to jacket material for communication cables.

2. Description of the Related Art

In the United States, plastics used in the construction of plenum rated cables are regulated under the National Fire Protection Association standard NFPA 90A: Standard for the Installation of Air Conditioning and Ventilating Systems. Plenum cable is jacketed with a fire retardant plastic jacket of either a low-smoke polyvinyl chloride (PVC) or a fluorinated ethylene polymer (FEP). All materials intended for use on wire and cables to be placed in plenum spaces are designed to meet rigorous fire safety test standards in accordance with NFPA 262 and outlined in NFPA 90A.

Polyvinylidene Fluoride, or PVDF is a highly non-reactive and pure thermoplastic fluoropolymer. PVDF is a specialty plastic material in the fluoropolymer family; it is used generally in applications requiring the highest purity, strength, and resistance to solvents, acids, bases and heat and low smoke generation during a fire event. Compared to other fluoropolymers, it has a smoother melt process because of its relatively low melting point of around 155~192° C. However, PVDF has a significant cost associated with it, making it less than ideal to use in its pure form.

To mitigate costs, prior cables have used a PVDF/PVC alloy composition for the jacket for both optical fiber and shielded data cable products. The PVDF is blended with PVC (lower cost) in order to reduce the cost of the finished compound while maintaining both the good flame properties and the mechanical properties of the PVDF. However, these PVDF/PVC alloys have problems with low temperature performance in the range of sub 0° C. temperatures due to the incompatibility of the two polymers. For example, the physical properties of the PVDF/PVC combination polymer jacket are extremely sensitive to manufacturing process variations, i.e. the two polymers do not weave/blend together, and thus the resulting cable jacket fractures easily in low temperatures. The prior art related to compatibilizers has not effectively addressed compatibilizers intended for plenum cables that have good low temperature performance.

Thus, although prior art plenum rated PVDF+PVC blends were available approximately 10 years ago, they were notorious for cracking at low temperatures. The present invention as claimed combines excellent flame and smoke performance with excellent low temperature properties.

OBJECTS AND SUMMARY

The present arrangement overcomes the drawbacks of the prior art by using a compatibilizing agent to improve the compatibility between the PVDF and PVC that results in an improved compatibility between the PVDF and PVC and the resultant improved/maintained physical properties, particularly with respect to cold temperature resistance.

To this end, the present arrangement includes a cable jacket comprising a ratio of PVDF, PVC and a compatibilizing agent where the ratio is selected in order to obtain compatibility between the PVDF and PVC while maintaining the physical properties necessary in order to meet various testing standards.

BRIEF DESCRIPTION OF THE DRAWINGS

The present invention can be best understood through the following description and accompanying drawings, wherein:

FIG. 3 is a chart comparing the low temperature brittleness values in accordance with one embodiment; and FIG. 4 is a chart illustrating the UL Oil Res II (Underwriters Laboratory Oil Resistance Test II) testing results in accordance with one embodiment.

DETAILED DESCRIPTION

Figure 1:
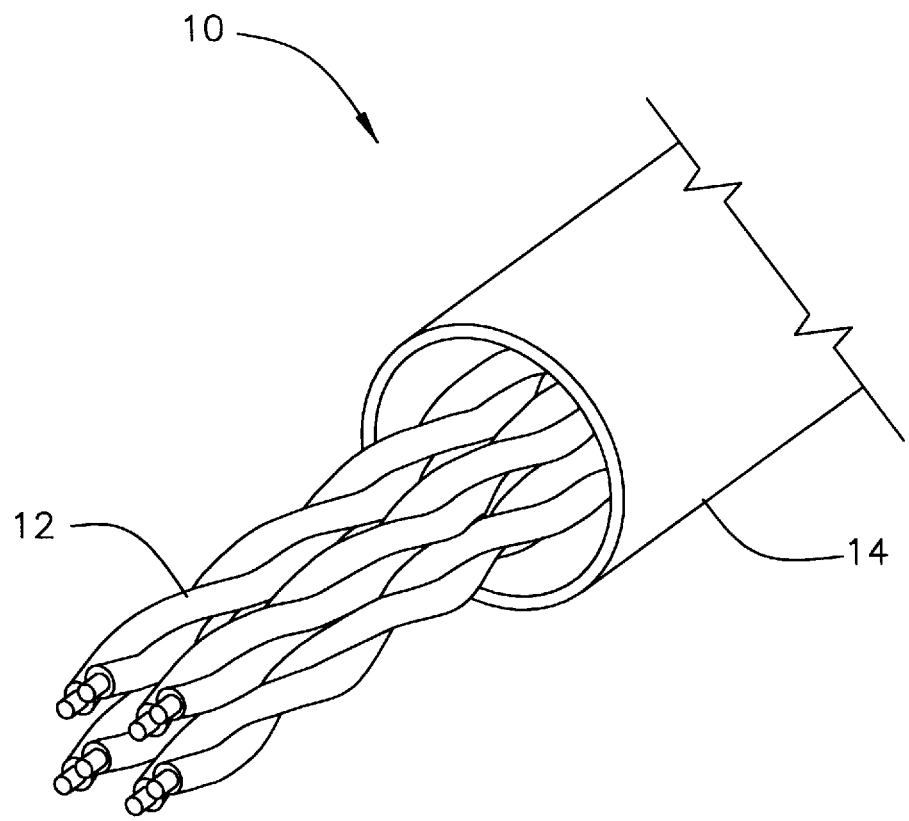
FIG. 1 shows a cable having a jacket in accordance with one embodiment.

FIG. 1 shows a typical LAN cable 10 having four twisted pairs 12 and a jacket 14. Although the example is shown as a four pair LAN cable, the same principles of the invention may be equally applied to coating and jackets used for fiber or other types of communication and power cables.

In one arrangement, jacket 14 of cable 10 is made from an extruded PVDF/PVC mixture as described in more detail below.

PVDF is a Fluoropolymer with a low melting temperature, ~155° C. or more, with outstanding flame and smoke properties. Jacket 14 is ideally made of substantially PVDF with some PVC and a compatibilizing agent added thereto. In one exemplary arrangement, the respective amounts of the three components are substantially in a ratio of 7:3:1; PVDF, PVC and compatibilizing agent (by weight) as described in more detail below.

The compatibilizing agent used to improve the compatibility between the PVDF and PVC is preferably E/nBA/CO=ethylene/n-butyl acrylate/carbon monoxide. For example, Du Pont™ Elvaloy® HP661 is an exemplary ethylene terpolymer (E/nBA/CO,) which is most commonly used as a modifier for a variety of other polymers. There are different types of ELVALOY, which are often blended with other polymers to modify their physical properties.

One use for ethylene terpolymer additives (such as ELVALOY) is as solid plasticizers in PVC. However, in addition to being compatible with PVC, the acrylate functionality present in the ELVALOY helps compatibilize it with PVDF as well. Moreover, the processing temperature of ELVALOY also falls within the range of both PVDF and PVC.

According to the present arrangement, the PVDF/PVC alloy for jacket 14 is made initially by blending pellets of all three materials together on a two roll mill and extruding strips through a single screw extruder. The combined PVDF, PVC, and Elvaloy pellets are added in the correct proportions at the feed throat of a twin screw compounding line. It is noted that this is one exemplary process for making the PVDF/PVC/additive blend for jacket 14, however, other processes may be used as well.

In one arrangement several tests were performed in order to optimize the relative levels of PVDF, PVC and the compatibilizing additive, to obtain the best performance qualitatively and economically while maintaining the processability of the compositions.

Figure 2:
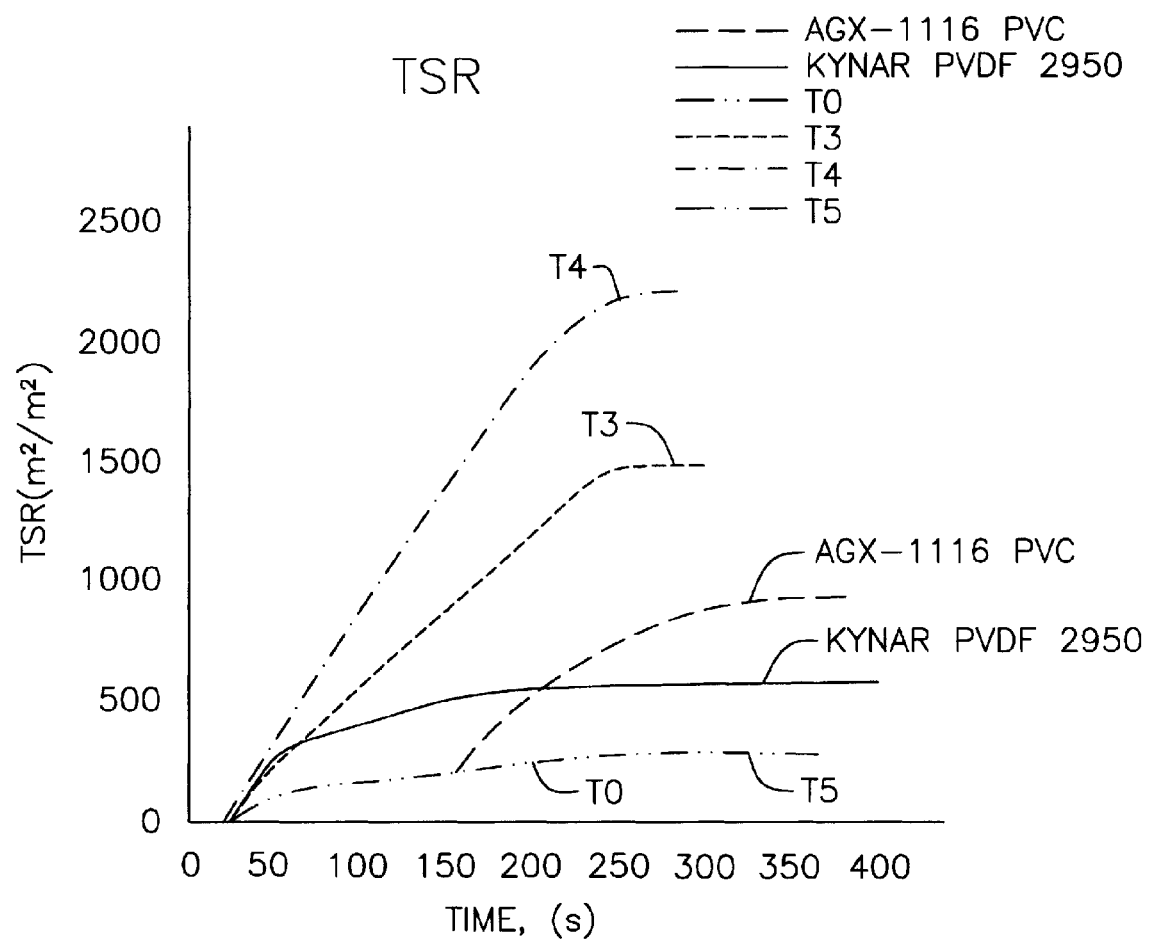
FIG. 2 illustrates cone calorimeter data regarding smoke properties in accordance with one embodiment.

FIG. 2 illustrates cone calorimeter data for a ratio of PVDF/PVC/Compatibilizer (7:3:1) which indicates a reduction in smoke with the PVDF/PVC/compatibilizer alloy (T5) versus the PVDF alone (brand name Kynar 2950) at a heat flux of 100 kW/m². In this test, the evolution of 500 TSR m²/m² (Total Smoke Release) was tested for samples of 100 mm×100 mm×3 mm plaque in the cone calorimeter at a heat flux of 100 kW/m².

On the graph, the total smoke release (TSR) is graphed over time (in seconds) for six different samples:

Kynar (PVDF)
AG X (PVC)
Present Samples (7:3:1 PVDF; PCV:comp)—one as pressed plaque (T0), the other is an extruded tape (T5)
T0=63.6% Kynar 2950 PVDF+27.3% PolyOne L-6815 PVC+9.1% DuPont Elvaloy HP 441
T5=63.6% Kynar 2950 PVDF+27.3% PolyOne L-6815 PVC+9.1% DuPont Elvaloy HP 441
Other samples with more PVC than present sample:
T3=50% Kynar 2950 PVDF+35.5% PolyOne L-6815 PVC+9.1% DuPont Elvaloy HP 441
T4=40% Kynar 2950 PVDF+45.0% PolyOne L-6815 PVC+15.0% DuPont Elvaloy HP 441

Thus, simply adding PVC to PVDF alone does not automatically result in better smoke properties than PVDF alone, but when the present ratio and compatibilizer is used it shows a two fold decrease.

Additionally, the composition of the present invention used for jacket 14 was also subjected to elongation breaking tests in the form of compression molded plaques. Tensile and elongation tests were run on the extruded tape to measure the strain at break and tensile strength. Strain at break refers to the elongation (in percentage) before a break and tensile strength is the related feature (in "PSI" Pounds Per/Square Inch) measuring the force required to cause a tensile break. Reference is made to FIG. 3, and tape T5, the present example, showing that the strength and strain at break are maintained in a high level when the composition is with the ratio of 7:3:1 among PVDF, PVC and E/nBA/CO.

As shown in FIG. 3, the two present examples, T0 and T5 (T0 using PVC L6815 and T5 using PVC X-1116) were able to achieve greater than 300% percent elongation of the compounded plastic sample before breaking. In other words, the plastic sample stretched over three times its original length when tested per ASTM D-638 testing standard before breaking.

Separately, as shown in FIG. 3 samples T0 and T5 were formed again as extruded tape on a single screw extruder. In this case, the strain at break for both samples still exceeded 280% (even better 462% for sample T0).

Moreover, the ASTM D 746 low temperature brittleness value obtained for T5 tape was −10° C. The ASTM D-746 value defines a procedure in which plastic sample of a certain geometry is placed in a liquid bath at low temperatures. They are then impacted by a quickly moving device at low temperatures. The temperature at which half of the samples break is defined as the brittleness temperature.

Generally, plenum rated cable jacket compounds with low temperature brittleness values of >0° C. are at a risk for low temperature failures in the field while compounds with low temperature brittleness values of <−10° C. have a lower risk of field failure. (Samples break in two when they fail the test and pass when they remain intact) As seen in the final row and column of FIG. 3, the LTB value for the primary present sample T5 is <−10° C.

Although the other samples shown in FIG. 3, such, as T3 and T4 also had good elongation breaking measurements under the same tests, as noted above in relation to FIG. 2, they did not have the advantageous total smoke release capabilities. Moreover, they did not perform well in cold temperature testing and were not able to achieve the low temperature rating of <−10° C. that the present composition (T5) could.

In another arrangement, referring to FIG. 4, UL Oil Res II testing was conducted on the sample cable using the exemplary T5 extruded test tape compound for jacket 14 of the test cable 10 described above. The compound for jacket 14 met the requirements for this severe oil resistance test by retaining at least 85% or even improving strain at break, modulus and tensile resistance after 60 days in oil. Typical PVC based plenum jacket compounds do not meet this strict requirement.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

What is claimed is:

1. A cable jacket comprising:
   an extruded polymer blend made from:
   PVDF;
   PVC; and
   a compatibilizing agent, said compatibilizing agent improving the compatibility between the PVDF and PVC,
   wherein said compatibilizing agent is added to said PVDF and said PVC in a ratio of PVDF to PVC to said compatibilizing agent of substantially 7:3:1, and in an amount sufficient to reduce the cold temperature brittleness relative to a similarly composed PVDF/PVC polymer blend without said compatibilizing agent.

2. The cable jacket of claim 1 wherein the level of PVDF is substantially 63.3%, the level of PVC is substantially 27.3%, and the level of compatibilizing agent is substantially 9.1%.

3. The cable jacket of claim 1 wherein the ratio of PVDF, PVC, and said compatibilizing agent is such that said polymer maintains a Low Temperature Breaking value of <10° C. under ASTM D 746 testing.

4. The cable jacket of claim 1 wherein said extruded polymer blend retains at least 85% rating of strain at break, modulus and tensile rating after 60 days in oil under UL Oil Res II testing.

5. The cable jacket of claim 1 wherein the extruded polymer blend is extruded as tape, which is applied as said cable jacket.

6. The cable jacket of claim 5 wherein said tape exhibits a strength and strain at break of at least at 2800 psi and 280% respectively.

7. The cable jacket of claim 1, wherein said compatibilzing agent is an E/nBA/CO=ethylene/n-butyl acrylate/carbon monoxide.

8. The cable jacket of claim 1, wherein said extruded polymer blend has a smoke evolution of substantially 500 TSR m²/m² when tested as a 100 mm×100 mm ×3 mm plaque in the cone calorimeter at a heat flux of 100 kW/m².

9. A cable jacket comprising:
   an extruded polymer blend made from PVDF, PVC and an E/nBA/CO=ethylene/n-butyl acrylate/carbon monoxide compatibilizing agent,
   wherein a ratio of PVDF, PVC and a compatibilizing agent is substantially 7:3:1, and
   wherein said compatibilizing, a eat is added to said PVDF and said PVC in an amount sufficient to reduce the cold temperature brittleness relative to a similarly composed PVDF/PVC polymer blend without said compatibilizing agent.

* * * * *

UNITED STATES PATENT AND TRADEMARK OFFICE
CERTIFICATE OF CORRECTION

PATENT NO.         : 8,486,502 B2
APPLICATION NO.    : 12/847283
DATED              : July 16, 2013
INVENTOR(S)        : Jiang et al.

Page 1 of 1

It is certified that error appears in the above-identified patent and that said Letters Patent is hereby corrected as shown below:

In the Claims

Claim 9, Column 4, Line 60: The word "a eat" between "," and "is" is misspelled, it should read "agent".

Signed and Sealed this
Third Day of September, 2013

Teresa Stanek Rea
*Acting Director of the United States Patent and Trademark Office*